Patented Aug. 1, 1933

1,920,211

UNITED STATES PATENT OFFICE 1,920,211

REFINING OF LEAD

Clarence T. Patterson, Syracuse, N. Y., assignor to The Solvay Process Company, Syracuse, N. Y., a Corporation of New York No Drawing. Application January 20, 1932
Serial No. 587,761

12 Claims. (Cl. 75—15)

This invention relates to improvements in the refining of lead and more particularly to the removal therefrom of impurities such as, for example, zinc, copper, iron, aluminum, and silicon and their oxides, and sulfur.

An object of this invention is to remove these impurities more rapidly and more completely than by previously known methods.

A further object of the invention is to provide a process employing inexpensive and easily obtainable reagents.

It is known that zinc may be removed from lead containing it by passing chlorine gas through the molten metal. It is also known that ammonium chloride may be used for the purification of lead by introducing a charge of ammonium chloride into a circulating stream of molten lead, allowing the mass to cool, and skimming off the dross when the mass has become quiescent.

It has now been discovered that if moist chlorine is employed and if ammonium chloride is added in sufficient quantity to provide, with the zinc chloride formed, a fluid flux on the surface of the molten lead, a far superior and more rapid separation of impurities results.

According to this invention moist chlorine is bubbled into molten lead containing impurities such as zinc, copper, iron, etc. At the same time ammonium chloride is added to the lead bath in quantities sufficient to form a flux with the zinc chloride formed and to maintain the flux in a fluid state, additional ammonium chloride being added from time to time during the operation, if necessary, to replace evaporation losses.

It will, of course, be understood that the proportion of ammonium chloride to zinc chloride present may be varied to a considerable extent. Where low temperatures are employed, a larger proportion of ammonium chloride may be present than where higher temperatures are employed. If an open pot is employed for the lead purification, the proportion of ammonium chloride which may be present will also depend upon the depth of the flux since, because of the cooling effect of the air, the surface of the flux will be at a considerably lower temperature than the flux at the surface of the lead. As an example of the proportions which may conveniently be employed, it has been found that a very satisfactory ratio of constituents is 7 parts of zinc chloride to 3 parts of ammonium chloride when chlorinating at any temperature between the melting point of the lead and about 800° F. Above this temperature the proportion of ammonium chloride present may decrease until at about 930° F. only about 1 part of ammonium chloride to 19 parts of zinc chloride are necessary. It has been found that compositions containing from 7 to 35 parts of zinc chloride for every 3 parts of ammonium chloride form very satisfactory fluxes at temperatures up to about 800° F. A suitable composition may conveniently be maintained if sufficient ammonium chloride is present to maintain a slight smoke at the upper surface of the flux.

If the lead to be purified does not contain sufficient zinc to form, upon chlorination, a fluid flux with ammonium chloride, zinc-ammonium chloride may be employed or zinc oxide, or zinc chloride may be added so that there will be present sufficient zinc-ammonium chloride to cover the surface of the molten lead. In this manner any lead chloride formed is retained in reactive form and may react with impurities, such as zinc, to re-form metallic lead, and any metallic lead carried along with the chlorides is not held by the dross, as in former processes, but is allowed to settle back into and unite with the mass of molten lead. Further, by maintaining the surface of the lead covered with a fluid flux, the chlorine may be introduced into the bath at an increased rate since loss of chlorine from the surface of the bath is substantially avoided.

In carrying out my invention it is preferred to employ chlorine gas containing about .5% by weight of water vapor, although, as will appear, the moisture content may vary above and somewhat below this figure. The preferred moisture content may be obtained by passing chlorine gas through water at about 70° to 75° F. to substantially completely saturate the gas with water vapor at this temperature. If it is desired to employ a gas containing greater percentages of moisture, the temperature of the water may be accordingly increased, for instance, if the water is heated to 125° F., a gas containing about 2.8% by weight of water vapor will be obtained. Large proportions of water vapor are not necessary, however, to obtain the improved results of my invention. Moisture content may be further increased, if desired, but if too large a proportion of water vapor is added, for example, if the water for absorption is maintained at a temperature close to its boiling point, the proportion of water in the gas mixture becomes increased to such an extent that the subsequent rapid absorption of the chlorine is hindered.

The surprising effect of the presence of water vapor in the chlorine gas used for purifying lead will be more readily appreciated from the fact that according to my invention, employing chlorine containing .5% by weight of water vapor, the absorption rate in the lead to be purified becomes three times as fast as that of dry chlorine when the bath is maintained at temperatures of about 930° F.; while, where the temperature of the lead bath is in the neighborhood of 800° F., the rate of absorption of the chlorine gas containing .5% of water vapor becomes 10 times that of the dry gas.

Proportions of water vapor lower than .5% may be used, if desired, but if the water content is reduced much below this value, the rate of absorption of the chlorine gas in the lead bath begins to decrease. Therefore, in order to obtain the maximum speed of absorption, the water vapor content should not be reduced a great deal below .5%. This decrease in the rate of absorption becomes appreciable if, when using the water absorption method outlined above, the temperature of the water to be vaporized is reduced much below 60° F. at which temperature the vapor content of the gas is about .4% by weight.

The following examples will serve to illustrate my invention.—

*Example I.*—35 tons of lead containing about .2 per cent zinc were melted and into the molten mass moistened gaseous chlorine was passed. The chlorine was piped from a cylinder through a wash bottle containing water at about 70–75° F. and hence was substantially saturated with water at this temperature. As the chlorination progressed, ammonium chloride was added in sufficient quantities to form a flux with the zinc chloride formed and maintain the flux in a fluid state. The chlorination was continued for about 5½ hours. About 25 pounds of chlorine were consumed and a total of about 75 pounds of NH4Cl were added throughout the chlorination period. When chlorination was completed, an additional 75 pounds of NH4Cl were added to solidify the flux. The solidified flux was then skimmed off. The zinc content of the lead was reduced to but 0.02 per cent as a result of the treatment.

*Example II.*—To 30 tons of melted lead, containing copper and sulfur impurities but substantially no zinc, about 150 pounds of zinc-ammonium chloride was added. Moistened chlorine as before was then passed into the melted lead at the rate of about 17 pounds per hour until substantially all of the copper and sulfur impurities were removed. The flux was then treated with additional NH4Cl as in the preceding example, and finally skimmed off.

It is to be understood that the above processes are given as examples of practicable methods of applying my invention and are not intended to define or limit the invention.

The temperature of treatment may vary between wide limits, the only essential condition being that the lead treated be maintained in a molten state during chlorination. However, it is not practicable to employ temperatures substantially above 950° F. when cast iron pots are employed since they deteriorate rapidly at higher temperatures. Where less than .02% zinc is initially present with the lead to be purified, it is advisable to chlorinate at a temperature of about 900° F. or not substantially below this temperature in order to avoid clogging of the chlorinating tubes with unmelted lead chloride.

Likewise the duration of treatment may vary depending on the quantity of impurities present and upon the rate at which chlorine is introduced, as well as the degree of purity required. By the practice of my invention, however, the chlorine may be introduced at a more rapid rate than in known purification processes employing chlorine and consequently the time necessary for purification will be less than was formerly necessary, and in addition a more complete separation of impurities with less loss of lead is effected.

If desired, the melted lead may be artificially agitated as by blowing with compressed air. This is not essential, however, since it has been found that the introduction of the gaseous chlorine will ordinarily produce sufficient agitation.

It is not necessary that additional NH4Cl be added to solidify the flux. Any material which with the flux will produce a dross that can be removed by skimming, may be employed. The flux may be thickened, for example, with fire clay, and the resulting dross can then be readily skimmed off.

I claim:

1. In a process for purifying lead the improvement which comprises treating the lead in molten condition with moist chlorine gas.

2. In a process for separating zinc from lead the improvement which comprises treating the lead in molten condition with chlorine gas containing not less than about .4 per cent water vapor.

3. In the process for purifying lead by contacting molten lead with chlorine, the improvement which consists in maintaining on the surface of the lead a flux of zinc-ammonium chloride.

4. In the process for separating zinc from lead by contacting the lead in molten condition with chlorine to produce zinc chloride, the improvement which consists in adding to the molten lead sufficient ammonium chloride to form a flux with the zinc chloride produced.

5. The process for purifying lead which comprises melting the lead to be purified, passing chlorine gas into the molten lead while maintaining on the surface of the lead a flux of zinc-ammonium chloride, and separating the purified lead from the flux.

6. The process for separating zinc from lead which process comprises maintaining the lead in molten condition and passing chlorine gas into the molten lead, ammonium chloride being added in sufficient quantities to form with the zinc chloride produced a flux on the surface of the lead, and separating the purified lead from the flux.

7. The process for purifying lead which comprises melting the lead to be purified, passing moist chlorine gas into the molten lead while maintaining on the surface of the lead a flux of zinc-ammonium chloride, and separating the purified lead from the flux.

8. The process for separating zinc from lead which process comprises maintaining the lead in molten condition and passing moist chlorine gas into the molten lead, ammonium chloride being added in sufficient quantities to form with the zinc chloride produced a flux on the surface of the lead.

9. The process for purifying lead which comprises melting the lead to be purified, passing chlorine gas into the molten lead while maintaining on the surface of the lead a flux of zinc-ammonium chloride, thickening the flux to form a dross capable of being removed by skimming, and skimming off the dross.

10. The process for separating zinc from lead which process comprises maintaining the lead in molten condition and passing chlorine gas into the molten lead, ammonium chloride being added in sufficient quantities to form with the zinc chloride produced a flux on the surface of the lead, thickening the flux to form a dross capable of being removed by skimming, and skimming off the dross.

11. The process for purifying lead which comprises melting the lead to be purified, passing moist chlorine gas into the molten lead while maintaining on the surface of the lead a flux of zinc-ammonium chloride, thickening the flux to form a dross capable of being removed by skimming, and skimming off the dross.

12. The process for separating zinc from lead which process comprises maintaining the lead in molten condition and passing moist chlorine gas into the molten lead, ammonium chloride being added in sufficient quantities to form with the zinc chloride produced a flux on the surface of the lead, thickening the flux to form a dross capable of being removed by skimming, and skimming off the dross.

CLARENCE T. PATTERSON.